Dec. 11, 1956 W. F. HUCK 2,773,412
ELECTRO-OPTICAL DEVICE FOR MEASURING THICKNESSES
OF COATINGS ON MATERIALS
Filed April 16, 1953 3 Sheets-Sheet 1
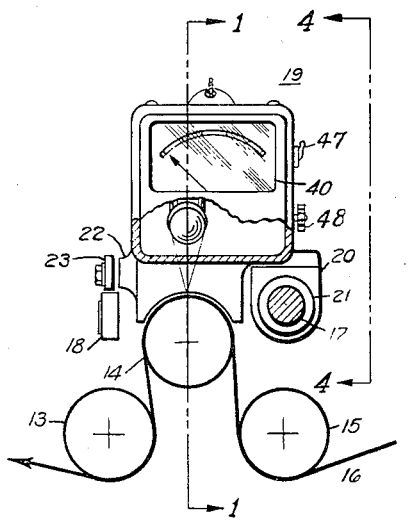
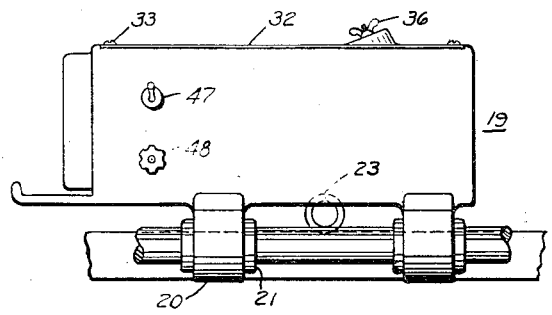
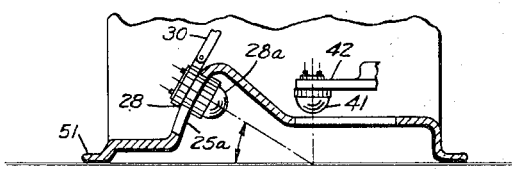
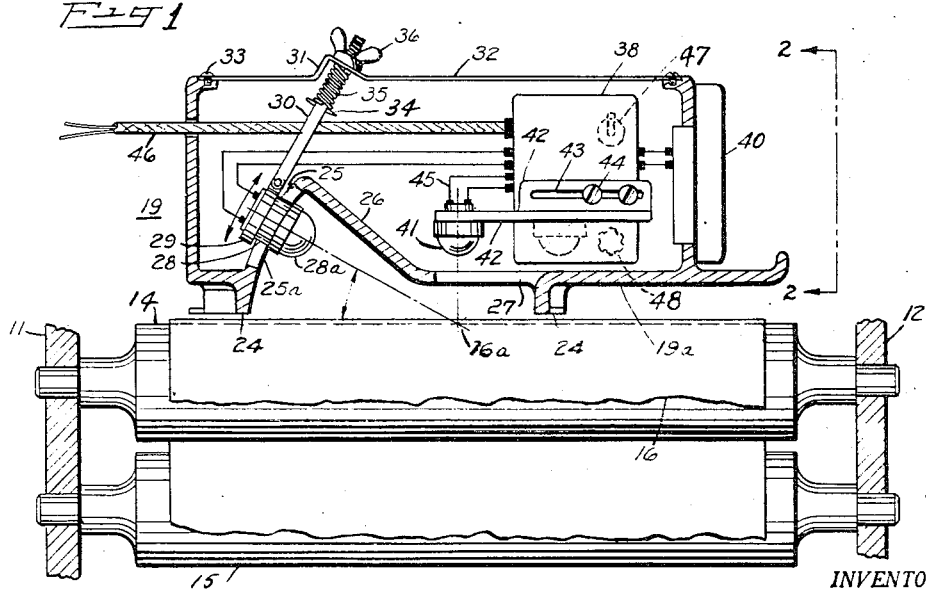
INVENTOR.
WILLIAM F. HUCK
BY
*ATTORNEY*

Dec. 11, 1956 W. F. HUCK 2,773,412
ELECTRO-OPTICAL DEVICE FOR MEASURING THICKNESSES
OF COATINGS ON MATERIALS
Filed April 16, 1953 3 Sheets-Sheet 2
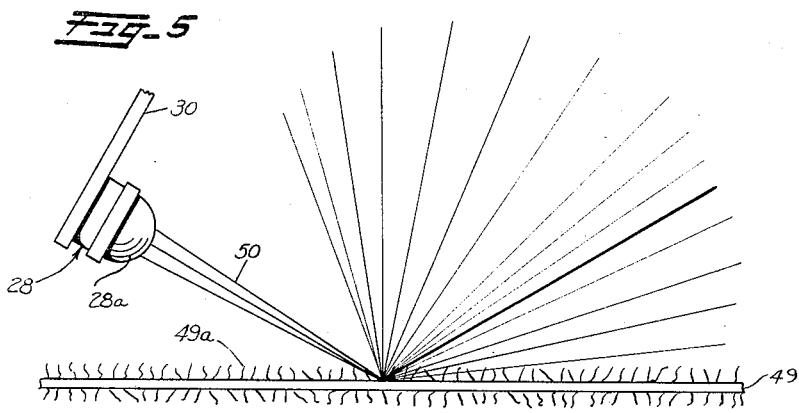
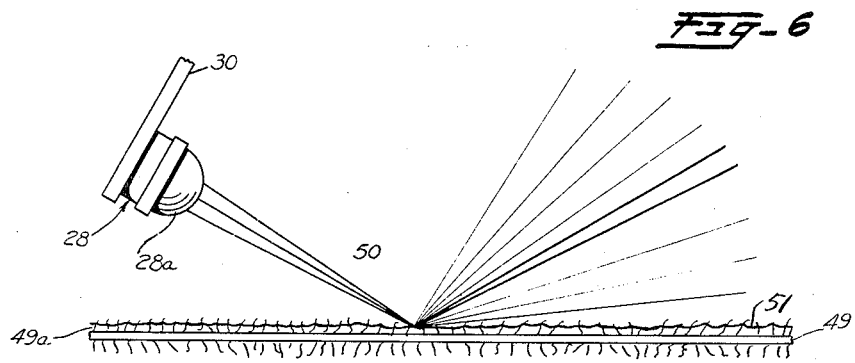
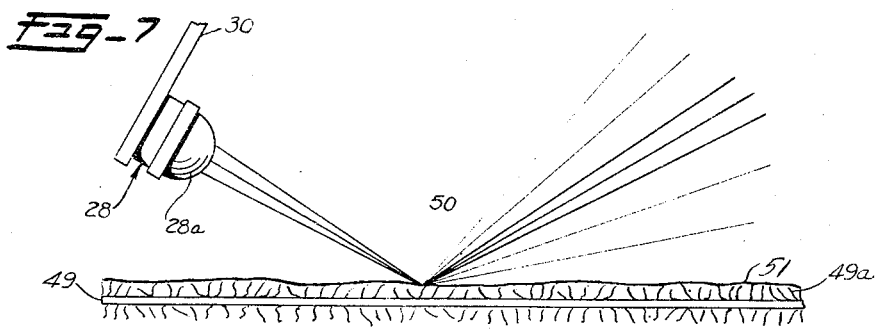
INVENTOR.
WILLIAM F. HUCK
BY
ATTORNEY Dec. 11, 1956  W. F. HUCK  2,773,412
ELECTRO-OPTICAL DEVICE FOR MEASURING THICKNESSES
OF COATINGS ON MATERIALS
Filed April 16, 1953  3 Sheets-Sheet 3

INVENTOR.
WILLIAM F. HUCK
BY
ATTORNEY

United States Patent Office 2,773,412
Patented Dec. 11, 1956

2,773,412

ELECTRO-OPTICAL DEVICE FOR MEASURING THICKNESSES OF COATINGS ON MATERIALS

William F. Huck, Forest Hills, N. Y., assignor to Huck Company, New York, N. Y., a partnership of New York Application April 16, 1953, Serial No. 349,151

2 Claims. (Cl. 88—14)

This invention relates in general to measuring devices and more particularly to apparatus designed and adapted for the measurement of coatings and the like on the surfaces of various materials.

An object of the invention is to provide means for detecting and/or measuring the thickness of a coating on a flat or curved surface.

Another object is the provision of a novel device embodying optical and electronic means for accurately and substantially instantaneously measuring the thickness of a coating on a web or sheet of material and the like.

Another object is to provide an electro-optical device adapted for use with adhesive-applying or protective coating-applying machines, and effective to measure the thickness of the coating applied while the process is in operation.

Another object is to provide a coating or deposit measuring device embodying electronic and optical instrumentalities for instantly and accurately measuring the thickness of the relatively thin coating being applied to various objects or surfaces whether of flat or curved configuration.

A further object is to provide a device of the kind indicated, of comparatively simple and relatively inexpensive construction, and which may be attached to conventional type coating-applying machines for the purpose of detecting and/or measuring the thickness of the coating during the process of its application.

Other objects and advantages residing in the combination and arrangement of parts and in the details of construction will appear as the description proceeds, and will be best understood when taken in connection with the accompanying drawings wherein:

Figure 1 is an enlarged, longitudinal, sectional view of a preferred embodiment of the invention, taken on line 1—1 of Figure 2, and showing the device operatively employed in measuring a coating on a curved surface;

Figure 2 is an end elevational view, as seen looking in the direction of the arrows 2—2 of Figure 1, with portions broken away for clarity of illustration;

Figure 3 is a fragmental, sectional view of the device slightly modified to adapt it for use in measuring the thicknesses of coatings on flat material;

Figure 4 is a fragmental, side elevational view of the device, as seen in the direction of the arrows 4—4 of Figure 2;

Figure 5 is a view showing, by way of example, the diffusion of light rays from the uncoated surface of a web of material;

Figure 6 is a view similar to Figure 5 and showing the lesser diffusion of light rays which occurs when the surface of the web or paper material has had a coating, such as an adhesive, applied thereto;

Figure 8:
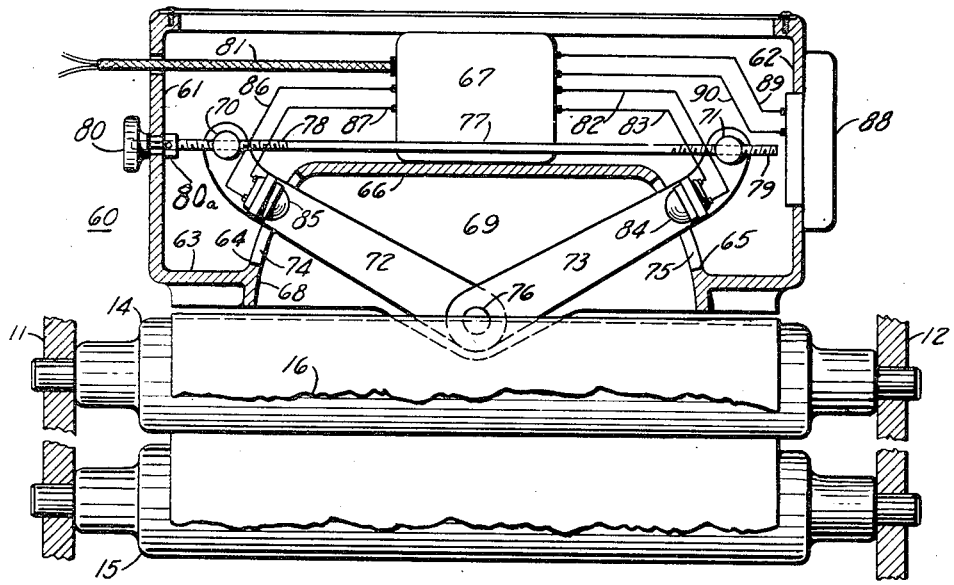

Figure 7 is a view similar to Figure 6 and showing the still further lessened diffusion of light rays reflected from the surface of the web of paper when a coating thicker than that shown in Figure 6 has been applied to the said web of paper; and Figure 8 is a longitudinal sectional view of another modified form of the invention wherein the light source and photo-electric cell are simultaneously and cooperably regulated.

In various arts, such as those associated with the paper, printing and pharmaceutical industries, a certain proportion of the products have a surface coating which, for example, may be an adhesive, a medicinal preparation, etc. In view of the relatively enormous amounts of such products manufactured, and the specific purposes for which they are used, it is essential that the thicknesses of the coatings applied be accurately measured.

Heretofore, the process of ascertaining the thickness of a surface coating entailed some loss of time, or at least a postponement of the measuring procedure until the drying was complete, since mechanical contact with the still moist coating on a traveling web of material, for measurement purposes, is only feasible after the said coating has dried.

The present invention contemplates, by the use of novel electro-optical means, the accurate and instantaneous measurement of a freshly applied coating, such as an adhesive, while still moist, on a traveling web of material. The device of the invention is adapted for direct attachment to or association with a coating-applying machine and without interference with the operation of the latter. The device, in addition, may also be used independently as a separate instrumentality for measuring coatings on the surfaces of various materials which may be flat, curved, etc.

Referring now in particular to the drawings wherein similar characters of reference indicate corresponding parts in the several views, 11 and 12 designate a pair of uprights or frames arranged in spaced parallelism and serving as a support for a plurality of web-guiding rollers 13, 14, 15 and around which the web 16 is operatively led.

In addition to the web-guiding rollers 13, 14 and 15, the side frames 11, 12 have fastened thereto a pair of bars or rails 17, 18 that serve as tracks on which a casing, designated generally at 19, is slidably supported. The casing 19, on one side, is provided with apertured lugs, as at 20, having bushings, as at 21, wherein the bar 17 is slidably accommodated. The opposite side of the casing 19 has a plurality of brackets or bosses, as at 22, that operatively support rollers 23 riding on the bar 18.

The horizontally disposed bottom or floor 19a of the casing 19 has downwardly projecting flanges or feet, as at 24 (Figure 1), and is bent upwardly and inwardly to provide an arcuate extension or shelf 25 which is folded angularly downward to form an inclined extension 26 communicating with the floor. Adjacent the junction of the said floor with the inclined extension 26 is an opening, as at 27, whose purpose is described hereinafter.

The arcuate shelf 25 is slotted, as at 25a, to accommodate the body portion of a light-projecting assembly 28 having a lens-equipped light bulb 28a. The light-projecting assembly 28 is fastened in any suitable manner, as by a clamp member 29, at the lower end of a rod 30 whose upper threaded end is protruded through an opening in an inclined abutment or prominence 31 formed on a lid or closure member 32 detachably secured to the top of the casing 19, as by the screws 33.

The shank of the rod 30 is transfixed by a pin 34 serving as a lower abutment for a compression spring 35 confined and exerting a biasing pressure between the said pin 34 and the under side of the abutment 31. The upper threaded end of the rod 30 is engaged by a wing nut 36. When the wing nut 36 is turned, it will be understood that the rod 30 may be bodily raised or lowered, thus adjusting the position of the attached light-projecting assembly 28 over the arcuate path provided by the slotted portion of the shelf 25.

The light bulb 28a is energized, via the leads 37, from an inner housing 38. The housing 38 is fastened to an adjacent wall of the casing 19 and encloses an electronic amplifier unit of conventional type (not shown) whose output is delivered, via leads 39, to an electronic indicating meter 40 fastened to the exterior of the casing 19.

As best shown in Figures 1 and 3, a photo-electric cell 41 is fastened to a bracket or arm 42 having a slot 43 adapted to slidably accommodate studs 44 threadedly engaged in the adjacent portion of the housing 38. The photo-electric cell 41 is operatively associated with the electronic amplifier, as by the wires 45.

A conduit 46 enclosing mains from a power source (not shown) is introduced through the casing 19 and into the inner housing 38, the power circuit being opened or clossed by an "on-off" switch 47, while the amplifier circuit (not shown) is controlled by a combination "on-off" switch and intensity control, indicated generally at 48.

In Figure 1, the device is shown as applied to an adjacent portion of a conventional type machine suitable for applying coatings to various materials, such as the web 16 feeding over rollers 13, 14, 15. As illustrated, it will be understood that the light-projecting assembly 28 has been initially adjusted to cast a beam of light on a preselected portion or area 16a of the upper surface of the web of paper 16 that is directly under the photo-electric cell 41 and substantially in coincidence with a line drawn through its vertical axis.

The function and mode of operation of the device has been in part indicated in the foregoing paragraphs, but will be more fully understood by inspection and consideration of the relative diffusion of light rays from the uncoated paper surface (Figure 5) and the diffusion of light rays from the two coated surfaces (Figs. 6 and 7) in accordance with the different thicknesses of coatings thereon.

In Figures 5, 6 and 7, a strip or web of uncalendered paper stock is shown, the fuzz or semi-microscopic hairs 49a thereon being depicted in magnified form. This fuzz, in the manner of a matte surface diffuses rays of light, indicated generally at 50, incident thereon. In Figures 6 and 7, due to the application of a coating 51, the rays of light are less diffused, but are more reflected than in the case of the uncoated surface illustrated in Figure 5. It is, of course, to be understood that although no vertical diffused rays are illustrated in Figures 6 and 7, there is sufficient vertical rays to effect the operation of the photo-electric cell 41 whose output recorded on the meter will accurately differentiate between the two thicknesses of coatings illustrated.

The light-projecting assembly 28 and the photo-electric cell 41 may be adjusted to various positions relatively to the web of material to be measured, and the device may be attached to the coating machine at such places as are most convenient or effective for making the desired measurements of the coatings on the materials. By inspection of Figure 1, it will be understood that when the wing nut 36 is turned, the rod 30 on which it is threaded will be raised or lowered, and consequently the light-projecting assembly with its light bulb 28a will be angularly displaced so that the rays of light will be projected at different angles with respect to the predetermined area 16a on the coating 51, thereby increasing or diminishing the effective amount of or the intensity of the light available to the photoelectric cell 41.

The photo-electric cell 41 may be adjusted in a horizontal plane by loosening the threaded studs 44, thus permitting the arm 42 carrying the said cell 41 to be slid relatively to the inner housing 38. This adjustment enables the photo-electric cell 41 to be moved relatively to the slot or opening 27 and consequently positioned over the illuminated spot 16a at the most convenient place for the latter.

*The disclosure of Figure 8*

The modified form of the invention, as depicted in Fig. 8, comprises a casing designated generally at 60 arranged above the web-guiding rollers 13, 14, 15 heretofore described, and adjacent the uppermost roller 14 about which the web 16 is led.

The casing 60, from which the front and back walls have been omitted for clarity of illustration, includes opposed walls 61, 62 whose lower ends are integral with a bottom 63 having upwardly-directed arcuate wall portions, as at 64, 65, that merge with a horizontal floor portion 66 on which an inner casing 67 enclosing an electronic amplifier (not shown) of conventional type is seated. The bottom 63 is provided with depending feet or flanges, as at 68. The configuration of the bottom 63, it will be observed, is such as to provide a recess 69 beneath the horizontal floor portion 66, for a purpose that will appear hereinafter.

Pivoted at their spaced upper ends within the casing 60 and on pins 70, 71, is a pair of links 72, 73 that protrude convergingly downward through openings 74, 75 in the arcuate wall portions 64, 65. The lower ends of the links 72, 73 are turnably connected to an exterior bar 76 located centrally beneath the floor portion 66.

It will be observed that the recess 69 provides space sufficient for the angular adjustments of the associated links 72, 73 on which the light source and photo-electric cell are mounted; and also space for the projection of light rays from the said light source and the reception of the reflected rays of light by the photo-electric cell, as described below.

The pins 70, 71 are held in spaced, parallel relation by a shaft or rod 77 having right-hand and left-hand threaded portions 78, 79 that engage similarly threaded portions or holes in the pins 70, 71. The shaft 77 is protruded through an elongated slot (not shown) in the side wall 61 and is secured against inward axial movement by a manipulating hand knob 80 fastened to its outer end and thrust against the outer surface of the side wall 61. The shaft 77 is also held against outward axial movement by a collar 80a pinned to the said shaft and in abutment with the inner side of the wall 61.

When the shaft 77 is turned, its right-hand and left-hand threaded portions 78, 79 will move the pins 70, 71 to an equal degree towards or away from each other, thereby decreasing or increasing the angular divergence of the attached links 72, 73. It will be apparent, by inspection of Figure 8, that when the links 72, 73 are angularly moved about the axis bar 76 in the manner indicated, their upper ends will raise or lower, thus bodily and correspondingly moving the shaft 77 in a vertical plane. This bodily raising or lowering of the shaft 77 under the circumstances described, is permitted by the above-referred to elongated slot (not shown) in the left hand wall 61.

The electronic amplifier (not shown) within the inner casing 67 is connected to power mains in a conduit 81 and has an input circuit (not shown) connected by leads 82, 83 to the photo-electric cell 84 mentioned above and which receives rays of light from the light-projecting assembly, previously referred to, designated generally at 85, secured to the link 72, and reflected from the coated web 16. The light-projecting assembly 85 is operatively connected by wires 86, 87 to conventional switching means (not shown) in the inner casing 67, the switching means being, in turn, connected to the power mains in the conduit 81.

The function and mode of operation of the modified form of the invention depicted in Figure 8 is somewhat similar to the other forms of the invention previously described, but differ therefrom by the provision of means which effect a simultaneous and coordinated adjustment of the light source 85 and the photo-electric cell 84.

Light projected from the light source 85 and impinging on the coated web 16 will be reflected thence into the photo-electric cell 84 fastened to link 73 and whose output is delivered to the electronic amplifier (not shown) via the leads 82, 83. The output of the electronic amplifier is, in turn, conveyed to an indicating meter 88 via the leads 89, 90.

It will be observed that the light-projecting assembly 85 and the photo-electric cell 84 may be preset to various angles by means of the manipulating knob 80 in order to turn the shaft 77. As illustrated these angles are equal relatively to the horizontal plane of the roll 14 on which the coated web 16 is supported.

Since the angle of reflection of light from a surface is equal to the angle of incidence, the light source 85 and the photo-electric cell 84 are, in this instance, preferably connected to the adjusting shaft 77 by means of the right-hand and left-hand threaded portions 78, 79 previously described, so as to conform to the laws governing the reflection of light. The present design and construction is such as to simultaneously and cooperably control the angle of movement of the light source and of the photo-electric cell so that the latter will, if desired, invariably receive the reflected rays of light in the same angle as that of their incidence upon a given surface.

It will be readily understood that the amount and/or intensity of light reflected from a transparent and/or translucent coating on the surface of a material, of a light color, for example, will vary appreciably with the thickness of the said coating. The light green color of a shallow stretch of sea water over a sandy bottom contrasting with the bluish cast of the adjacent deeper water is a familiar and well known example of this fact. In the present instance, light from the source 85, after passing through the coating 51 to the upper surface of the web 16 and thence back through the said coating to the photo-electric cell 84, will be attenuated by virtue of absorption in the coating, the intensity of the light decreasing as a function of the thickness and absorbing characteristics of the medium, in accordance with the well-known physical properties of light in general.

In the description accompanying the first form of the invention, it was mentioned that the fuzz or semi-microscopic hairs 49a to be found, for example, on uncalendered paper, provided a convenient means for determining the thickness of a coating thereon. In addition, and in accordance with the present form of the invention, the thickness of a coating on any light-reflecting surface may be determined, as above-mentioned, by projecting a beam of light through the said coating onto the material, in the present instance, paper, receiving the reflected light from the material and after passing through the coating, in a photoelectric cell, preferably positioned so that the angle of incidence of the light is equal to the angle of reflection thereof; and then applying the output of the photo-electric cell to an amplifier unit connected to suitable electronic indicating means.

It is to be understood that the invention is susceptible to some modification and change without departing from the spirit or essential attributed thereof; and it is therefore desired that the present embodiments be considered in all respects as illustrative and not restrictive, reference being had to the appended claims rather than to the foregoing description to indicate the scope of the invention.

What I claim is:

1. In a device for measuring the thickness of a transparent coating upon the surface of a material, said device including a casing arranged in operative proximity to the coating on the said material, a member arranged in the casing, said member being translationally movable and turnably mounted in the casing, a pair of links swingably associated with and movable by the member, said links having end portions protruded exteriorly of the casing, a source of light secured to one of the links and projecting light through the coating and onto the material, a photoelectric cell secured to the other of the links and receiving light reflected from the material and issuing out of the coating, and indicating means mounted on the casing and electrically connected to the photo-electric cell; whereby the thickness of a transparent coating on a material may be indicated by said indicating means.

2. In a device for measuring the thickness of a transparent coating on a material, said device including a casing arranged in operative proximity to the said coating, slot means arranged in a portion of the casing, a member slidably and turnably arranged in the casing, a pair of links mechanically connected to and movable by the member, said links being protruded through the slot means and having their adjacent ends pivotally connected to a bar, a source of light secured to one of the links and projecting light through the coating and onto the material, a photoelectric cell secured to the other of the links and receiving light reflected from the material and issuing out of the coating, and indicating means mounted on the casing and electrically connected to the photo-electric cell; whereby the thickness of a transparent coating on a material may be indicated by said indicating means.

References Cited in the file of this patent

UNITED STATES PATENTS

| 1,269,663 | Wappler | June 18, 1918 |
| 1,756,785 | Gallasch | Apr. 29, 1930 |
| 1,917,379 | Lowry | July 11, 1933 |
| 1,949,619 | Pfund | Mar. 6, 1934 |
| 2,352,570 | Seely | June 27, 1944 |
| 2,584,583 | Hillery | Feb. 5, 1952 |
| 2,645,971 | Herbst | July 21, 1953 |

OTHER REFERENCES

Hardy and Perrin: Principles of Optics, first edition 1932, published by McGraw-Hill Book Company, New York, New York, pages 26–28.

Ser. No. 400,876, Fukusima (A. P. C.), published June 1, 1943.